US 8,970,896 B1

(12) United States Patent
Barkai et al.

(10) Patent No.: US 8,970,896 B1
(45) Date of Patent: Mar. 3, 2015

(54) PRINTING QUALITY DETERMINATION BASED ON TEXT ANALYSIS

(71) Applicant: International Business Machines Corporation, Armonk, NY (US)

(72) Inventors: Gilad Barkai, Haifa (IL); Shai Erera, Kiryat Ata (IL); Ariel Raviv, Haifa (IL); Haggai Roitman, Yoknea'm Elit (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/010,565

(22) Filed: Aug. 27, 2013

(51) Int. Cl.
  *H04N 1/40* (2006.01)
  *G06K 15/02* (2006.01)
  *G06F 17/28* (2006.01)

(52) U.S. Cl.
  CPC .......... *G06K 15/1867* (2013.01); *G06F 17/28* (2013.01)
  USPC .......................................... 358/1.18; 358/448

(58) Field of Classification Search
  USPC ......... 358/1.9, 1.18, 518, 448, 520, 500, 504, 358/406, 515, 521, 501; 382/162–167
  See application file for complete search history.

(56) References Cited

U.S. PATENT DOCUMENTS

| 6,738,587 B1 | 5/2004 | Hoene et al. |
| 6,757,071 B1 | 6/2004 | Goodman et al. |
| 8,687,239 B2 * | 4/2014 | Eschbach et al. ............ 358/3.26 |
| 2009/0067005 A1 | 3/2009 | Chelvayohan et al. |

FOREIGN PATENT DOCUMENTS

| EP | 0736999 | 3/2003 |
| WO | 2008/106004 | 9/2008 |

OTHER PUBLICATIONS

Grundland et al., "The Decolorize Algorithm for Contrast Enhancing, Color to Grayscale Conversion", University of Cambridge, Computer Laboratory, Technical Report No. 649, Oct. 2005.
Lim et al., "A Novel Adaptive Color to Grayscale Conversion Algorithm for Digital Images", Scientific Research and Essays vol. 7(30), pp. 2718-2273, Aug. 2012.
Saravanan C., "Color Image to Grayscale Image Conversion", 2010 Second International Conference on Computer Engineering and Applications ICCEA, pp. 196-199.

* cited by examiner

*Primary Examiner* — Thomas D Lee
*Assistant Examiner* — Stephen M Brinich

(57) ABSTRACT

A method comprising using at least one hardware processor for: analyzing text in a digital document, to identify a text segment referring to a figure of the digital document; mapping said text segment to said figure; identifying, in said text segment, reference to one or more non-grayscale colors of said figure, to determine a level of importance of said one or more colors to legibility of said figure; and printing said digital document in accordance with the level of importance.

20 Claims, 4 Drawing Sheets

PRINTING QUALITY DETERMINATION BASED ON TEXT ANALYSIS

BACKGROUND

Data generated by computing devices is often printed by ink-jet, laser or other types of printers. These printers adhere ink or toner onto a printable medium, such as paper. The ink or toner may be stored, for example, in a cartridge. The cartridge may then be replaced when the ink or the toner is consumed.

In the case of significant ink or toner consumption, the high frequency of replacement of the cartridges results in higher costs. In fact, a significant cost associated with owning a printer is that of replacing used printer cartridges. While the price of printers is currently decreasing, the price of printer cartridges generally does not. Thus a user may be persuaded to buy a printer because it is less expensive, but is then committed to frequent purchases of more expensive printer cartridges.

Color ink, which usually includes cyan (C), magenta (M) and yellow (Y) colors, is sometimes more expensive than black (K) ink. Therefore, many users elect to save on color (CMY) and opt to print color documents only in black. This, however, may degrade the legibility and/or aesthetics of the printed document.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with an embodiment, a method comprising using at least one hardware processor for: analyzing text in a digital document, to identify a text segment referring to a figure of the digital document; mapping said text segment to said figure; identifying, in said text segment, reference to one or more non-grayscale colors of said figure, to determine a level of importance of said one or more non-grayscale colors to legibility of said figure; and printing said digital document in accordance with the level of importance.

There is further provided, in accordance with an embodiment, a printing server comprising a non-transitory computer-readable storage medium having program code embodied therewith, the program code executable by at least one hardware processor of the printing server to: receive a digital document for printing; analyze text in the digital document, to identify a text segment referring to a figure of the digital document; map said text segment to said figure; identify, in said text segment, reference to one or more non-grayscale colors of said figure, to determine a level of importance of said one or more non-grayscale colors to legibility of said figure; and transmit said digital document to one or more printers in accordance with the level of importance.

There is further provided, in accordance with en embodiments, a computer program product for document analysis, the computer program product comprising a non-transitory computer-readable storage medium having program code embodied therewith, the program code executable by at least one hardware processor to: receive a digital document for printing; analyze text in the digital document, to identify a text segment referring to a figure of the digital document; map said text segment to said figure; identify, in said text segment, reference to one or more non-grayscale colors of said figure, to determine a level of importance of said one or more non-grayscale colors to legibility of said figure; and transmit said digital document to one or more printers in accordance with the level of importance.

In some embodiments, said printing comprises printing, in said one or more non-grayscale colors, a page which includes said figure, wherein the page which includes said figure is part of the digital document.

In some embodiments, said printing in said one or more non-grayscale colors comprises polychromatic printing.

In some embodiments, said printing further comprises printing, in grayscale, a page which does not include said figure, wherein the page which does not include said figure is part of the digital document.

In some embodiments, the method further comprises decolorizing said figure, wherein said printing is printing in grayscale.

In some embodiments, the method further comprises: converting said reference to a color-invariant descriptor; and converting said one or more non-grayscale colors of said figure to a color-invariant texture corresponding to the color-invariant descriptor.

In some embodiments, the method further comprises displaying a printing recommendation to a user, based on the level of importance.

In some embodiments, said transmit comprises transmit a page which includes said figure to a polychromatic printer, wherein the page which includes said figure is part of the digital document.

In some embodiments, said transmit further comprises transmit a page which does not include said figure to a monochromatic printer, wherein the page which does not include said figure is part of the digital document.

In some embodiments, the program code is further executable by said at least one hardware processor of the printing server to decolorize said figure, wherein said printing is printing in grayscale.

In some embodiments, the program code is further executable by said at least one hardware processor of the printing server to: convert said reference to a color-invariant descriptor; and convert said one or more non-grayscale colors of said figure to a color-invariant texture corresponding to the color-invariant descriptor.

In some embodiments, the program code is further executable by said at least one hardware processor of the printing server to display a printing recommendation to a user, based on the level of importance.

In some embodiments, the program code is further executable by said at least one hardware processor to decolorize said figure, wherein said printing is printing in grayscale.

In some embodiments, the program code is further executable by said at least one hardware processor to: convert said reference to a color-invariant descriptor; and convert said one or more non-grayscale colors of said figure to a color-invariant texture corresponding to the color-invariant descriptor.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

A method for efficient utilization of printing resources is disclosed herein. The method may be embodied as a system, method or computer program product. For example, the method may be embodied in a print server configured to receive print jobs from various computing devices and transmit the print jobs to one or more printers.

Figure 4:
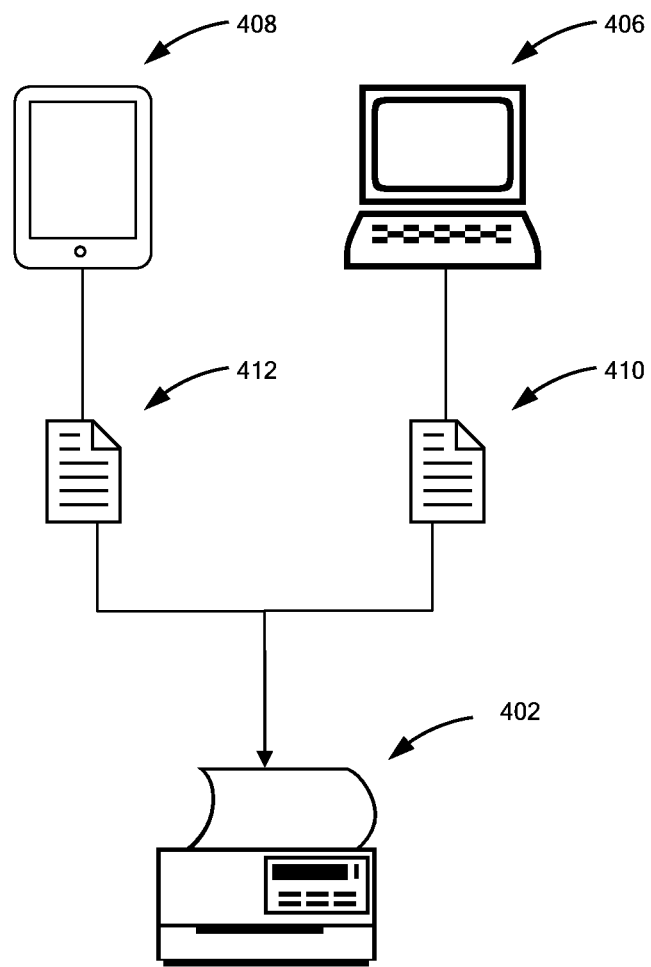
FIG. 4 shows a network diagram of yet another environment in which the method may be executed.

In some embodiments thereof, the method includes analyzing the contents of a print job, namely—text appearing in a digital document sent for printing. The analysis includes identification of one or more text segments which refer to one or more figures appearing in the document. For example, such a text segment may read "FIG. 4 shows a pie chart, in which the red slice indicates the amount of . . . ". Once the one or more text segments have been identified, their one or more referenced figures are located, and a map of segments and their associated figures is created. For example, the aforementioned text segment may be mapped to the pie chart by way of providing coordinates of the pie chart on a respective page.

The method continues by identifying, in the one or more text segments, one or more references to one or more non-grayscale colors of the figure. For example, the wording "the red slice" of the segment may be identified. Since it refers to a non-grayscale, in this example red, color of the figure.

After these references have been identified, the method proceeds by determining a level of importance of the one or more non-grayscale colors to the legibility of the figure. In a simplistic scenario, the mere appearance of color names in the text segment is sufficient to conclude that the colors are important to the legibility of the figure. In a more complex scenario, contextual analysis may be performed, to deduce whether the color contents of the figure may be safely converted to grayscale or whether their legibility will be significantly harmed as a result of the conversion. For example, the analysis may weigh the density of color names in and/or near the text segment. The density may be computed as the ratio between words being color names and other words. Higher density implies a higher level of importance, and vice versa. The level of importance may be binary, for example "important" and "not important". Alternatively, the level may be on a more diverse scale, for example a percentage-based scale or the like.

Advantageously, the efficient utilization of printing resources is enabled by harnessing the determined level of importance. For example, if it is determined that the level of importance of the one or more non-grayscale colors to the legibility of the one or more figures is above a certain threshold, the printing of the document may be adapted to achieve efficient utilization of printing resources. As one example, a page or multiple pages on which that figure(s) appear may be printed in polychromatic printing, while the rest of the pages of the document may be printed in cheaper, monochromatic (e.g. grayscale) printing. This printing may be carried out using two separate printers, such as a polychromatic printer (also referred to as a "color" printer) and a grayscale printer, or using a single, polychromatic printer having separate cartridges for black ink and ink in one or more other colors.

As another example of efficient utilization of printing resources, the entire document may be printed in monochrome, but the one or more figures may be decolorized using a technique which mitigates or even eliminates any illegibility in the printed outcome. For example, the technique may be that of Wei Hong Lim and Nor Ashidi Mat Isa, "A novel adaptive color to grayscale conversion algorithm for digital images", Scientific Research and Essays Vol. 7(30), pp. 2718-2730, 2 Aug. 2012, which is incorporated herein by reference in its entirety.

A further example includes, similar to the previous one, a printing of the entire document in monochrome, however while replacing the non-grayscale elements of the one or more figures with suitable color-invariant texture, such as different types of hatching, etc. Optionally, the text segments which refer to these non-grayscale colors are also amended, to describe the color-invariant texture instead of describing the non-grayscale colors.

While the aforementioned examples may be carried out automatically, such as by a print server receiving a print job, a workstation sending the print job or the printer itself, it is also possible to allow the user to manually elect how to act upon the determination of the level of importance. The user may then manually trigger one or more of the methods discussed in the above examples.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a hardware processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
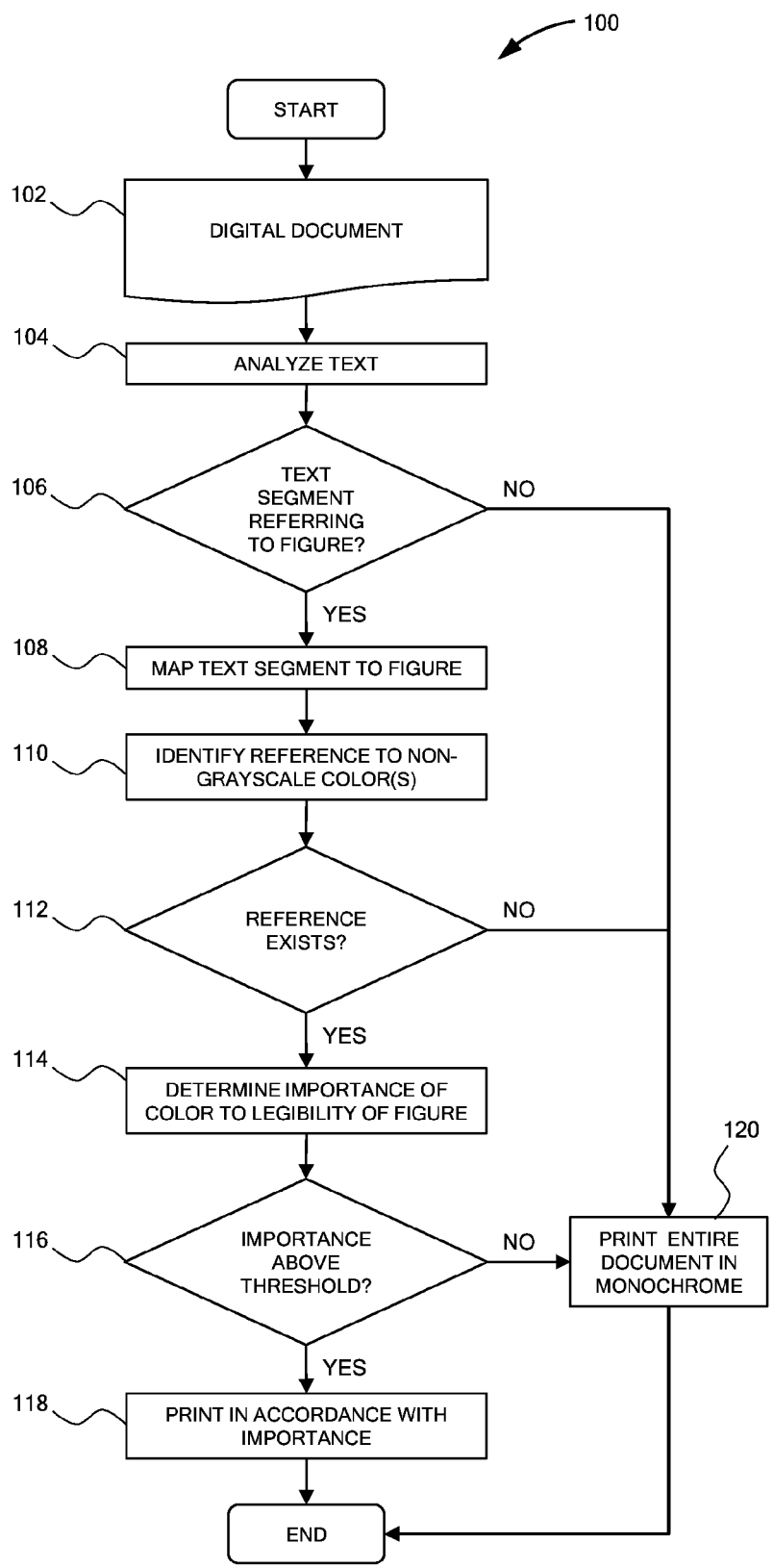
FIG. 1 shows a method for document analysis.

Reference is now made to FIG. 1, which shows a flowchart of a method 100 for document analysis, in accordance with an embodiment. In a step 102, a digital document is provided or received, for example at a workstation, at a print server, at a printer, and/or the like. The digital document includes text contents and optionally non-textual contents, such as graphics (charts, graphs, photographs, illustrations, tables etc.). These non-textual contents are hereinafter referred to as "figures". As another option, the non-textual contents may include descriptive text in them or in their vicinity, such as various titles accompanying the graphics.

Examples of a digital document include word processing documents, spreadsheet documents, presentation documents, etc.

In a step 104, the text of the digital document is analyzed, to identify one or more text segments which refer to one or more figures being part of the contents of the digital document. In a step 106, it is determined whether such text segment has been found. If no text segments referring to one or more figures was found, then the method may proceed to a step 120, in which the entire digital document is printed in monochrome, for example in grayscale. That is, if no text is referring to a figure, then either the document does not include any figures and can be safely printed in monochrome, or the text does include one or more figures but the importance of printing them in polychrome is relatively low.

If, however, one or more such text segments were found, the method may proceed to a step 108, in which each found segment is mapped (also "linked" or "associated") to its respective figure. For example, the text segments "The results are shown in the graph of FIG. 32, wherein the red like illustrates the trend." may be mapped to the location of that FIG. 32 in the document. The location of the figure may be either by way of providing its coordinates relative to the page, or using any other method known in the art. For example, the figure may have a unique identifier, so that the text segment may be mapped to this unique identifier. Optionally, the mapping is stored in a memory of the computing device carrying out method 100.

In a step 110, the one or more found text segments are analyzed, in order to identify whether they contain any reference to one or more non-grayscale colors of the mapped figure(s). In the exemplary text segment "The results are shown in the graph of FIG. 32, wherein the red like illustrates the trend", there is reference to a red color in the figure. The analysis of step 110 may include a search, inside the found text segment(s), for a pre-provided list of names of colors, shades, etc.

In a step 112, it may be determined whether reference to one or more non-grayscale colors has been identified. If no such reference is identified, it may be deduced that any non-grayscale colors appearing in the figures, if such colors exist, are not important. Accordingly, the method may proceed to step 120, in which the entire digital document is printed in monochrome.

However, if it is determined that reference to one or more non-grayscale colors has been identified, the method may proceed to a step 114, in order to determine the level of importance of the identified one or more non-grayscale colors to the legibility of the method. In a simplistic scenario, the mere appearance of color names in the text segment is sufficient to conclude that the colors are important to the legibility of the figure. For example, a text analysis algorithm may be employed, to detect color names appearing at a certain distance from a name of a figure (e.g. "FIG. 32", "Illustration 1.1", etc.). For example, the distance may be lower than a few dozen words or even than a few words. This close distance is indicative that the color names have likely been mentioned to describe the figure.

In a more complex scenario, contextual analysis may be performed, to deduce whether the color contents of the figure may be safely converted to grayscale or whether their legibility will be significantly harmed as a result of the conversion.

In a step 116 it is determined whether the determined level of importance is higher or lower than a predetermined threshold. If it is lower than the threshold, the method may continue to step 120, in which the entire digital document is printed in monochrome. If, however, the level of importance is higher than the predetermined threshold, the method may continue to a step 118, in which the digital document is printed in accordance with the level of importance.

Optionally, prior to the printing, the user may be prompted with a notification of any figured and/or text segments that were determined to have important color in them. The user may then decide if and how to print the digital document or parts thereof.

Figure 2:
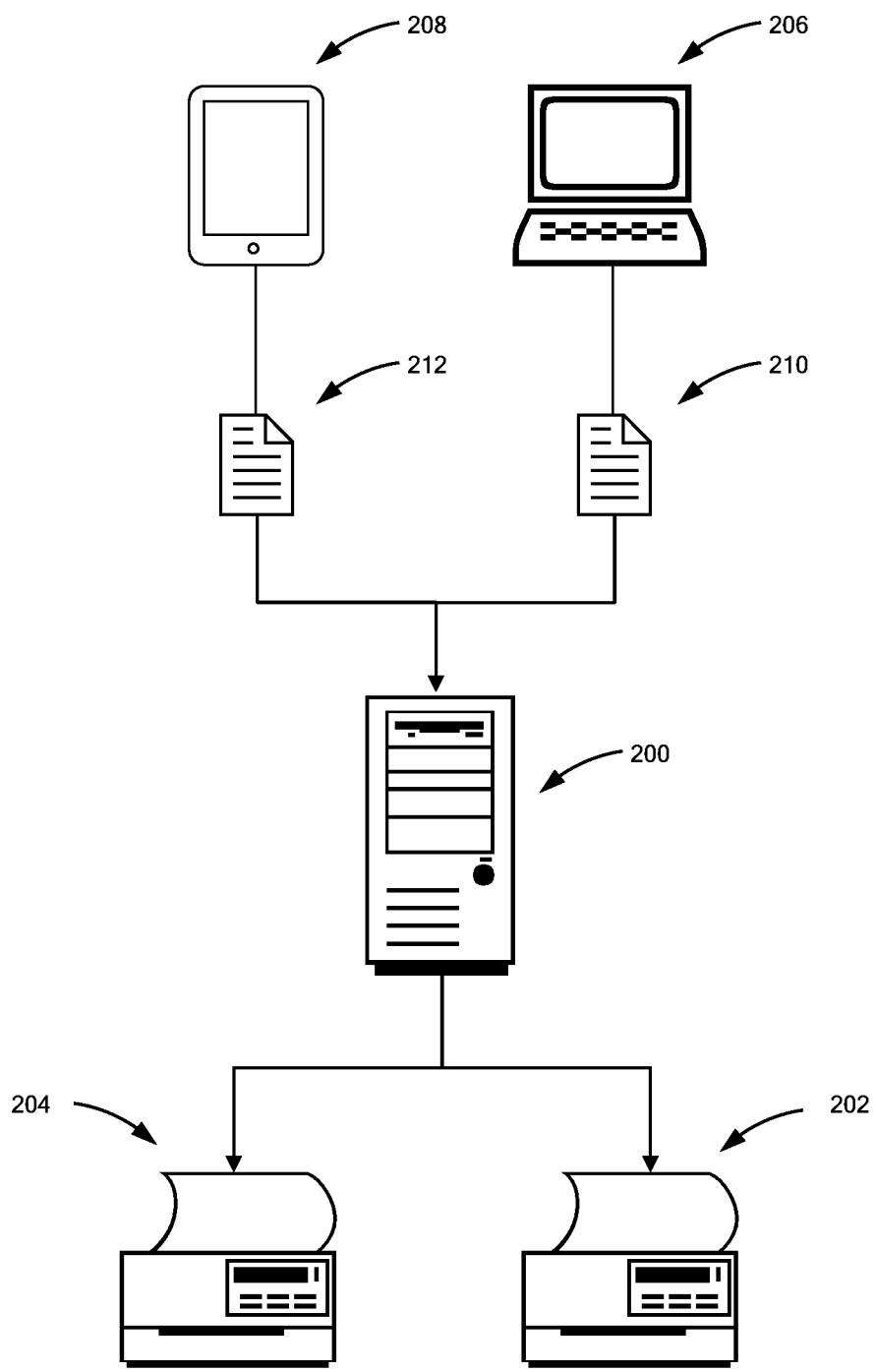
FIG. 2 shows a network diagram of an environment in which the method may be executed.

Reference is now made to FIG. 2, which shows a network diagram of an environment in which method 100 (FIG. 1) may be executed. The environment may include one or more client computers, such as a personal computer (PC) 206 and a tablet computer 208, configured to send a digital document 210 and 212, respectively, for printing. Documents 210 and/or 212 may be sent to a print (or "printing") server 200. Print server 200 may be a device that connects one or more printers, such as a grayscale printer 202 and a polychromatic (or "color") printer 204, to one or more client computers, such as PC 206 and tablet 208, over a network. Print server 200 may accept print jobs from PC 206 and/or tablet 208 PC 206 and tablet 208, and send the jobs to the appropriate printers, queuing the jobs locally to accommodate the fact that work may arrive more quickly than the printer can actually handle it. Ancillary functions of print server 200 include the ability to inspect the queue of jobs to be processed, the ability to reorder or delete waiting print jobs, and/or the ability to do various kinds of accounting (such as counting pages printer, which may involve reading data generated by the printer(s).

In an embodiment, method 100 (FIG. 1) may be executed by print server 200. Accordingly, print server 200 may decide to which of printers 202 and 204 to send the print job of the digital document. For example, if it has been determined that grayscale printing is sufficient for the entire document, whether due to the lack of color figures or due to the converting of the color figures to grayscale, then the print job may be sent to grayscale printer 202. If, on the other hand, it has been determined that at least one of the figures needs to be printed in color, than print server 200 may divert the printing of the page(s) on which that figure(s) appears to color printer 204, and the printing of the rest of the pages to grayscale printer 202.

Figure 3:
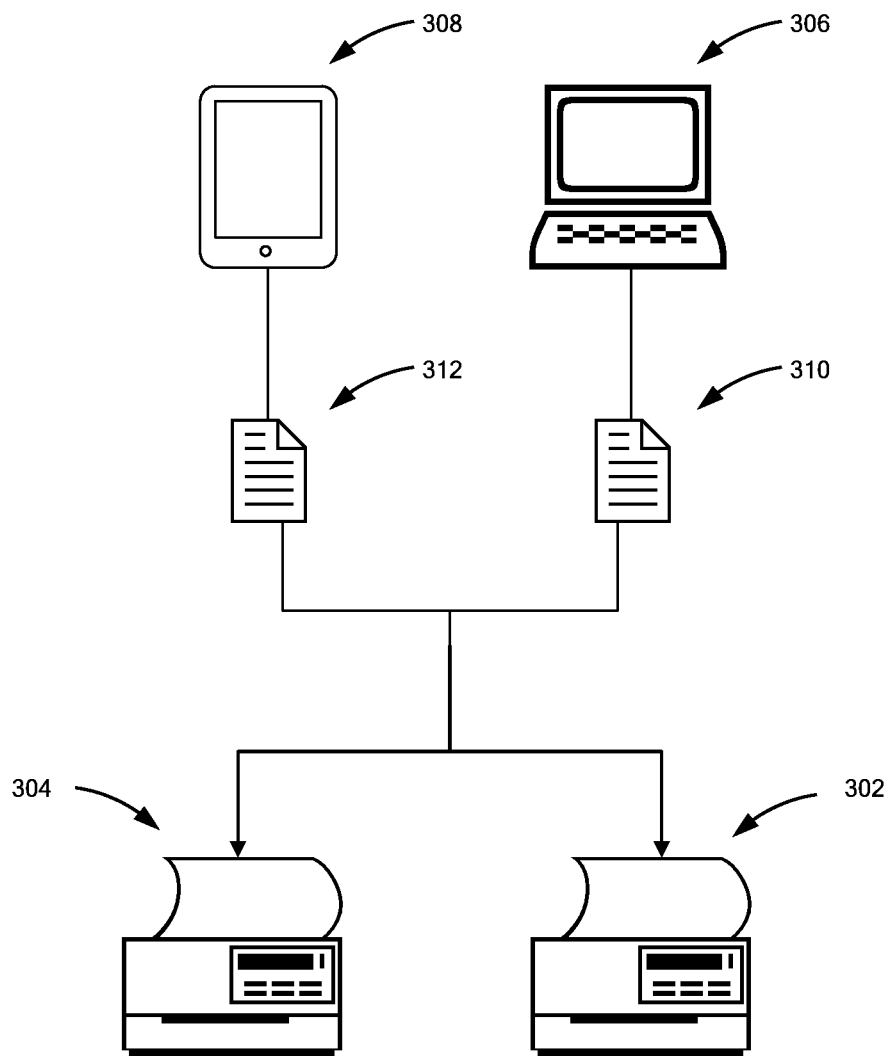
FIG. 3 shows a network diagram of another environment in which the method may be executed.

Reference is now made to FIG. 3, which shows a network diagram of another environment in which method 100 (FIG. 1) may be executed. The environment of FIG. 3, as opposed to that of FIG. 2, lacks a print server. Instead, client computers, such as a PC 306 and a tablet 308, may send print jobs directly to one or more printers. In this scenario, method 100 may be executed by each of the client computers, which may decide where to send the print jobs (or parts thereof) to—a grayscale printer 302 and/or a color printer 304. For example, it may be determined by PC 308 that two pages of document 310 need to be printed by color printer 304, whereas the other ten pages of this document need to be printed by grayscale printer 302. As another example, it may be determined by tablet 308 that all the pages of a digital document 312 are to be printed in grayscale printer 302.

Reference is now made to FIG. 4, which shows a network diagram of another environment in which method 100 (FIG. 1) may be executed. The environment of FIG. 4, as opposed to the environment of FIG. 3, includes only a single printer 402, in which different cartridges or toners are used for printing different colors. The client computers, in this case a PC 406 and a tablet 408, may instruct printer 402 which color(s) to utilize for which pages of a print job. For example, PC 408 may instruct printer 402 to print two pages of document 410 in CMYK (Cyan, Magenta, Yellow, Black), whereas the other ten pages of this document are printed while only utilizing a black cartridge/toner of the printer.

As another option, printer 402 itself may be configured to execute method 100 (FIG. 1). That is, printer 402 may be configured similar to print server 200 (FIG. 2), utilizing the printer's internal memory and processing units.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising using at least one hardware processor for:
    analyzing text in a digital document, to identify a text segment referring to a figure of the digital document;
    mapping said text segment to said figure;
    identifying, in said text segment, reference to one or more non-grayscale colors of said figure, to determine a level of importance of said one or more non-grayscale colors to legibility of said figure; and
    printing said digital document in accordance with the level of importance.

2. The method according to claim 1, wherein said printing comprises printing, in said one or more non-grayscale colors, a page which includes said figure, wherein the page which includes said figure is part of the digital document.

3. The method according to claim 2, wherein said printing in said one or more non-grayscale colors comprises polychromatic printing.

4. The method according to claim 2, wherein said printing further comprises printing, in grayscale, a page which does not include said figure, wherein the page which does not include said figure is part of the digital document.

5. The method according to claim 1, further comprising decolorizing said figure, wherein said printing is printing in grayscale.

6. The method according to claim 5, wherein:
    said decolorizing of said figure comprises converting said one or more non-grayscale colors of said figure to a color-invariant texture; and the method further comprises converting said reference to a color-invariant descriptor of the color-invariant texture.

7. The method according to claim 1, further comprising displaying a printing recommendation to a user, based on the level of importance.

8. A printing server comprising a non-transitory computer-readable storage medium having program code embodied therewith, the program code executable by at least one hardware processor of the printing server to:
receive a digital document for printing;
analyze text in the digital document, to identify a text segment referring to a figure of the digital document;
map said text segment to said figure;
identify, in said text segment, reference to one or more non-grayscale colors of said figure, to determine a level of importance of said one or more non-grayscale colors to legibility of said figure; and
transmit said digital document to one or more printers in accordance with the level of importance.

9. The printing server according to claim 8, wherein said transmit comprises transmit a page which includes said figure to a polychromatic printer, wherein the page which includes said figure is part of the digital document.

10. The printing server according to claim 9, wherein said transmit further comprises transmit a page which does not include said figure to a monochromatic printer, wherein the page which does not include said figure is part of the digital document.

11. The printing server according to claim 10, wherein said monochromatic printer is a grayscale printer.

12. The printing server according to claim 8, wherein the program code is further executable by said at least one hardware processor of the printing server to decolorize said figure, wherein said printing is printing in grayscale.

13. The printing server according to claim 12, wherein:
said decolorize of said figure comprises converting said one or more non-grayscale colors of said figure to a color-invariant texture; and
the program code is further executable by said at least one hardware processor of the printing server to convert said reference to a color-invariant descriptor of the color-invariant texture.

14. The printing server according to claim 8, wherein the program code is further executable by said at least one hardware processor of the printing server to display a printing recommendation to a user, based on the level of importance.

15. A computer program product for document analysis, the computer program product comprising a non-transitory computer-readable storage medium having program code embodied therewith, the program code executable by at least one hardware processor to:
receive a digital document for printing;
analyze text in the digital document, to identify a text segment referring to a figure of the digital document;
map said text segment to said figure;
identify, in said text segment, reference to one or more non-grayscale colors of said figure, to determine a level of importance of said one or more non-grayscale colors to legibility of said figure; and
transmit said digital document to one or more printers in accordance with the level of importance.

16. The computer program product according to claim 13, wherein said transmit comprises transmit a page which includes said figure to a polychromatic printer, wherein the page which includes said figure is part of the digital document.

17. The computer program product according to claim 14, wherein said transmit further comprises transmit a page which does not include said figure to a monochromatic printer, wherein the page which does not include said figure is part of the digital document.

18. The computer program product according to claim 15, wherein said monochromatic printer is a grayscale printer.

19. The computer program product according to claim 13, wherein the program code is further executable by said at least one hardware processor to decolorize said figure, wherein said printing is printing in grayscale.

20. The computer program product according to claim 19, wherein:
said decolorize of said figure comprises converting said one or more non-grayscale colors of said figure to a color-invariant texture; and
the program code is further executable by said at least one hardware processor to convert said reference to a color-invariant descriptor of the color-invariant texture.

\* \* \* \* \*